United States Patent
Joseph et al.

(10) Patent No.: US 11,284,298 B2
(45) Date of Patent: Mar. 22, 2022

(54) HEADER COMPRESSION AND DECOMPRESSION MANAGEMENT

(71) Applicant: QUALCOMM Incorporated, San Diego, CA (US)

(72) Inventors: Vinay Joseph, Calicut (IN); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,000

(22) Filed: Oct. 8, 2020

(65) Prior Publication Data

US 2021/0112448 A1    Apr. 15, 2021

Related U.S. Application Data

(60) Provisional application No. 62/914,297, filed on Oct. 11, 2019.

(51) Int. Cl.
*H04W 28/06* (2009.01)

(52) U.S. Cl.
CPC ............................ *H04W 28/06* (2013.01)

(58) Field of Classification Search
CPC ..... H04W 28/06; H04W 28/12; H04W 88/16; H04L 12/28; H04L 63/18; H04L 65/1069; H04L 69/04
See application file for complete search history.

(56) References Cited

U.S. PATENT DOCUMENTS

| | | | | |
|---|---|---|---|---|
| 9,178,717 | B1* | 11/2015 | Ruble | H04L 12/4645 |
| 2005/0271066 | A1* | 12/2005 | Valadarsky | H04L 69/22 |
| | | | | 370/401 |
| 2011/0128975 | A1* | 6/2011 | Kang | H04L 69/22 |
| | | | | 370/477 |
| 2011/0299406 | A1* | 12/2011 | Vobbilisetty | H04L 43/0811 |
| | | | | 370/248 |
| 2013/0128808 | A1* | 5/2013 | Wentink | H04L 61/6022 |
| | | | | 370/328 |
| 2013/0128809 | A1* | 5/2013 | Wentink | H04L 29/0604 |
| | | | | 370/328 |

(Continued)

FOREIGN PATENT DOCUMENTS

EP    2104310 A1    9/2009

OTHER PUBLICATIONS

International Search Report and Written Opinion—PCT/US2020/070648—ISA/EPO—dated Mar. 23, 2021.

(Continued)

*Primary Examiner* — Syed Ali (74) *Attorney, Agent, or Firm* — Harrity & Harrity, LLP (57) ABSTRACT

Various aspects of the present disclosure generally relate to wireless communication. In some aspects, a wireless communication device may determine a type of a packet for header compression or decompression, wherein the type of the packet includes at least one of an Ethernet-only packet type or an Ethernet packet with Internet Protocol (IP) payload type. The wireless communication device may perform Ethernet header compression or decompression on the packet. The wireless communication device may selectively perform IP header compression or decompression on the packet based at least in part on the type of the packet. Numerous other aspects are provided.

10 Claims, 7 Drawing Sheets

(56) References Cited

U.S. PATENT DOCUMENTS

| | | | | |
|---|---|---|---|---|
| 2014/0112349 A1* | 4/2014 | Moreno | ............. | H04L 12/4633 |
| | | | | 370/400 |
| 2014/0369365 A1* | 12/2014 | Denio | ..................... | H04L 69/16 |
| | | | | 370/474 |
| 2015/0373160 A1* | 12/2015 | Singh | ..................... | H04L 69/04 |
| | | | | 370/392 |
| 2015/0373161 A1* | 12/2015 | Singh | ..................... | H04L 69/08 |
| | | | | 370/474 |
| 2019/0173980 A1* | 6/2019 | Detwiler | ................ | H04L 69/22 |

OTHER PUBLICATIONS

Jeon H., et al., "Transmission of IP over Ethernet over IEEE 802.16 Networks; rfc5692.txt", Transmission of IP Over Ethernet Over IEEE 802.16 Networks, RFC5692.TXT, Internet Engineering Task Force, IETF, Standard, INTernet Society (ISOC) 4, Rue Des Falaises CH-1205 Geneva, Switzerland, Oct. 28, 2009 (Oct. 28, 2009), XP015068102, pp. 1-21, [retrieved on Oct. 28, 2009] p. 1 pp. 9-11.
Partial International Search Report—PCT/US2020/070648—ISA/ EPO—dated Jan. 22, 2021.

\* cited by examiner

FIG. 7

HEADER COMPRESSION AND DECOMPRESSION MANAGEMENT

CROSS-REFERENCE TO RELATED APPLICATION

This Patent Application claims priority to U.S. Provisional Patent Application No. 62/914,297, filed on Oct. 11, 2019, entitled "HEADER COMPRESSION AND DECOMPRESSION MANAGEMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for header compression and decompression management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include determining a type of a packet for header compression or decompression, wherein the type of the packet includes at least one of an Ethernet-only packet type, an Ethernet packet with Internet Protocol (IP) payload type, an Ethernet packet with IP version 4 (IPv4) payload type, or an Ethernet packet with IP version 6 (IPv6) payload type; performing Ethernet header compression or decompression on the packet; and selectively performing IP header compression or decompression on the packet based at least in part on the type of the packet.

In some aspects, a method of wireless communication, performed by a wireless communication device, may include identifying a set of homogeneously-typed packets for transmission using a communication channel, wherein the set of homogeneously-typed packets includes one packet type of an Ethernet-only packet type, an Ethernet packet with IP payload type, an Ethernet packet with IPv4 payload type, or an Ethernet packet with IPv6 payload type; and communicating the set of homogeneously typed packets using the communication channel.

In some aspects, a wireless communication device for wireless communication may include memory and one or more processors operatively coupled to the memory. The memory and the one or more processors may be configured to determine a type of a packet for header compression or decompression, wherein the type of the packet includes at least one of an Ethernet-only packet type, an Ethernet packet with IP payload type, an Ethernet packet with IPv4 payload type, or an Ethernet packet with IPv6 payload type; perform Ethernet header compression or decompression on the packet; and selectively perform IP header compression or decompression on the packet based at least in part on the type of the packet.

In some aspects, a wireless communication device for wireless communication may include memory and one or more processors operatively coupled to the memory. The memory and the one or more processors may be configured to identify a set of homogeneously-typed packets for transmission using a communication channel, wherein the set of homogeneously-typed packets includes one packet type of an Ethernet-only packet type, an Ethernet packet with IP payload type, an Ethernet packet with IPv4 payload type, or an Ethernet packet with IPv6 payload type; and communicate the set of homogeneously typed packets using the communication channel.

In some aspects, a non-transitory computer-readable medium may store one or more instructions for wireless communication. The one or more instructions, when executed by one or more processors of a wireless communication device, may cause the one or more processors to: determine a type of a packet for header compression or decompression, wherein the type of the packet includes at least one of an Ethernet-only packet type, an Ethernet packet with IP payload type, an Ethernet packet with IPv4 payload type, or an Ethernet packet with IPv6 payload type; perform Ethernet header compression or decompression on the packet; and selectively perform IP header compression or decompression on the packet based at least in part on the type of the packet.

In some aspects, a non-transitory computer-readable medium may store one or more instructions for wireless communication. The one or more instructions, when executed by one or more processors of a wireless communication device, may cause the one or more processors to: identify a set of homogeneously-typed packets for transmission using a communication channel, wherein the set of homogeneously-typed packets includes one packet type of an Ethernet-only packet type, an Ethernet packet with IP payload type, an Ethernet packet with IPv4 payload type, or an Ethernet packet with IPv6 payload type; and communicate the set of homogeneously typed packets using the communication channel.

In some aspects, an apparatus for wireless communication may include means for determining a type of a packet for header compression or decompression, wherein the type of the packet includes at least one of an Ethernet-only packet type, an Ethernet packet with IP payload type, an Ethernet packet with IPv4 payload type, or an Ethernet packet with IPv6 payload type; means for performing Ethernet header compression or decompression on the packet; and means for selectively performing IP header compression or decompression on the packet based at least in part on the type of the packet.

In some aspects, an apparatus for wireless communication may include means for identifying a set of homogeneously-typed packets for transmission using a communication channel, wherein the set of homogeneously-typed packets includes one packet type of an Ethernet-only packet type, an Ethernet packet with IP payload type, an Ethernet packet with IPv4 payload type, or an Ethernet packet with IPv6 payload type; and means for communicating the set of homogeneously typed packets using the communication channel.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
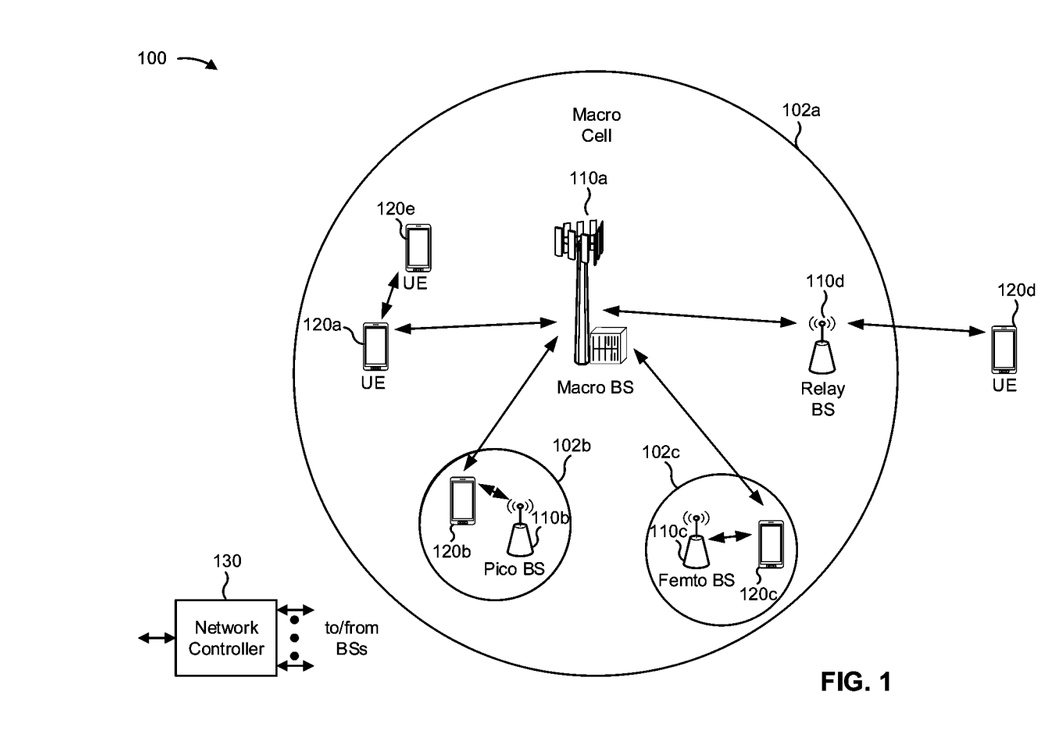
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
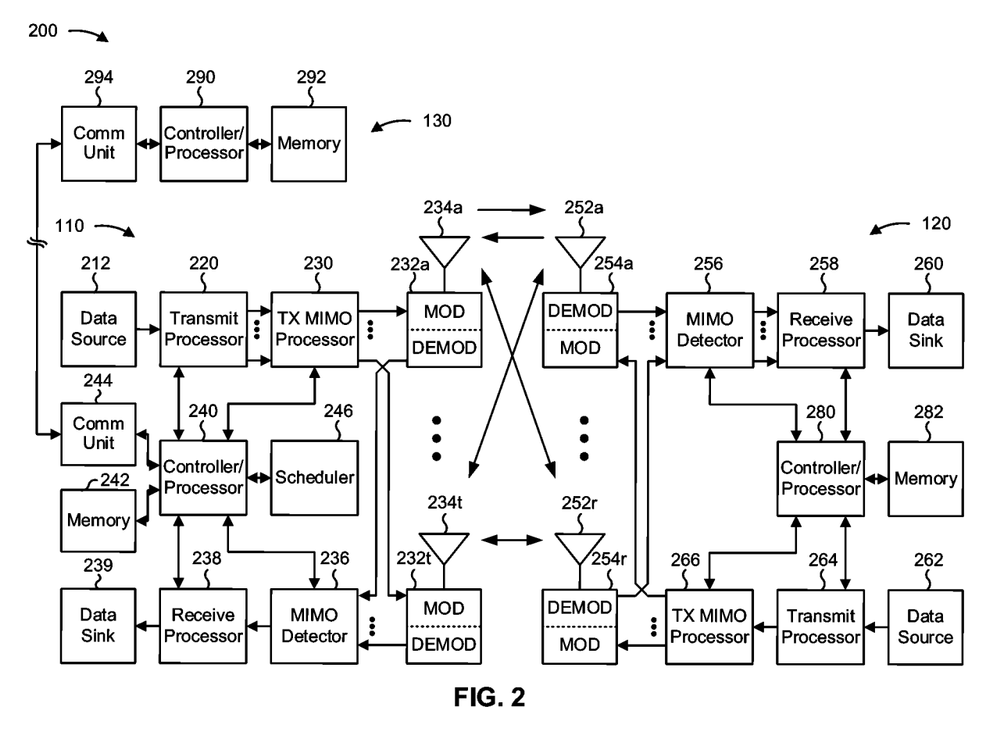
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with header compression and decompression management, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, a wireless communication device, such as BS 110 or UE 120, may include means for determining a type of a packet for header compression or decompression, wherein the type of the packet includes at least one of an Ethernet-only packet type or an Ethernet packet with Internet Protocol (IP) payload type; means for performing Ethernet header compression or decompression on the packet; means for selectively performing IP header compression or decompression on the packet based at least in part on the type of the packet, and/or the like. In some aspects, a wireless communication device, such as BS 110 or UE 120, may include means for identifying a set of homogeneously-typed packets for transmission using a communication channel, wherein the set of homogeneously-typed packets includes one packet type of an Ethernet-only packet type or an Ethernet packet with Internet Protocol (IP) payload type; means for communicating the set of homogeneously typed packets using the communication channel, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
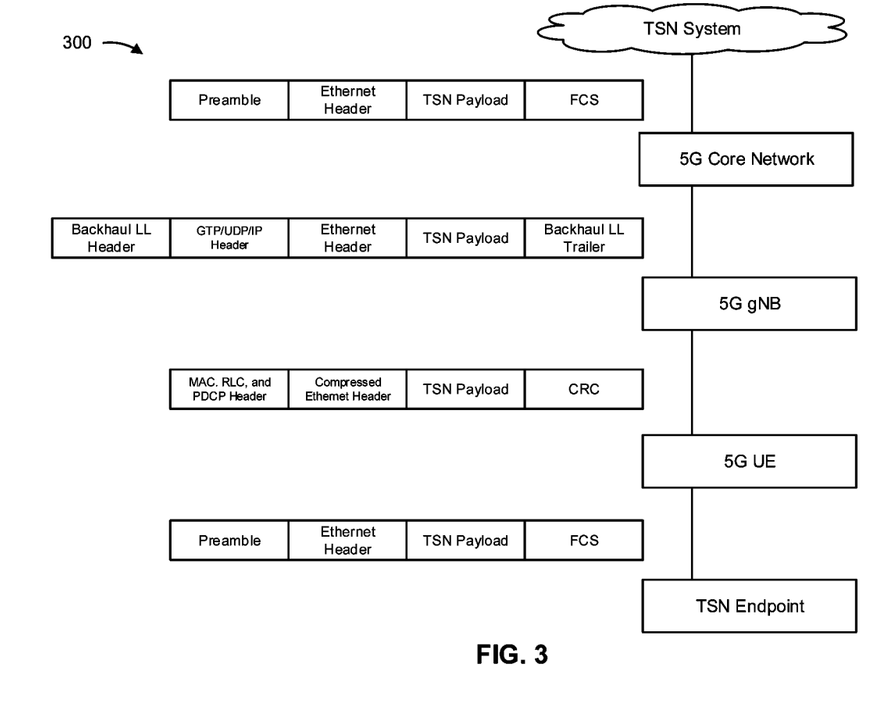
FIG. 3 is a block diagram conceptually illustrating an example of a time sensitive network deployment, in accordance with various aspects of the present disclosure.

FIG. 3 is a block diagram illustrating an example 300 of a time sensitive network deployment, in accordance with various aspects of the present disclosure.

As shown in FIG. 3, example 300 may include a time sensitive network (TSN) system, a 5G core network, a 5G gNB (e.g., BS 110), a 5G UE (e.g., UE 120), and a time sensitive network endpoint. Packets conveyed between the TSN system and the 5G core network may be conveyed with a preamble, an Ethernet header, a time sensitive network payload, and a frame check sequence (FCS). Packets conveyed between the 5G core network and the 5G gNB may be conveyed with a first type of header (e.g., a backhaul link layer (LL) header), a second type of header (e.g., a general packet radio service tunneling protocol (GTP) header, a user datagram protocol (UDP) header, an IP header, and/or the like), a third type of header (e.g., an Ethernet header), a time sensitive network payload, and a backhaul link layer trailer. In this case, the IP header may be an IPv4 header, an IPv6 header, and/or the like.

Packets conveyed between the 5G gNB and the 5G UE may be conveyed with a first type of header (e.g., a medium access control (MAC) header, a radio link control (RLC) header, a packet data convergence protocol (PDCP) header), a second type of header (e.g., an Ethernet header, that may be compressed), a time sensitive network payload, and a cyclic redundancy check (CRC). In some aspects, packets conveyed between the 5G gNB and the 5G UE may include IP payload and an IP header, such as an IPv4 header, an IPv6 header, and/or the like. Packets conveyed between the 5G UE and the time sensitive network endpoint may include a preamble, an Ethernet header, a time sensitive network payload, and a frame check sequence.

In some cases, as shown, for packets communicated between the 5G gNB and the 5G UE, the 5G gNB and the 5G UE may support Ethernet header compression as a PDCP function. For example, the 5G gNB may perform Ethernet header compression on downlink packets and the 5G UE may perform Ethernet header compression on uplink packets, thereby reducing over-the-air (OTA) network traffic relative to transmitting packets with uncompressed Ethernet headers. Additionally, the 5G gNB and the 5G UE may support IP header compression. For example, the 5G gNB may perform IP header compression using a robust header compression (RoHC) algorithm and/or the like. In some cases, the IP header compression may be for IPv4 headers, IPv6 headers, and/or the like. Applying incorrect compression and/or decompression may result in errors. For example, applying IP header decompression to a packet type without IP payload (e.g., an Ethernet-only packet type) may result in an error. Similarly, failing to perform IP header decompression on a packet type with IP payload (e.g., an Ethernet packet with IP payload packet type, an Ethernet packet with IPv4 payload packet type, an Ethernet packet with IPv6 payload packet type, and/or the like) may result in a failure to successfully process a packet.

Some aspects described herein provide for header compression and decompression management. For example, in some cases, selective header compression and decompression may be performed to ensure that Ethernet-only or compressed Ethernet-only type packets are not subjected to IP header compression. Moreover, selective header compression and decompression may be performed to ensure that, for a particular type of packet (e.g., a packet with an IPv4 payload or an IPv6 payload), a corresponding particular type of header compression or decompression (e.g., IPv4 header decompression or IPv6 header decompression, respectively) is used.

In some aspects, a wireless communication device, such as a UE or BS, may identify a type of a packet and perform selective header compression or decompression based at least in part on the type of the packet. Additionally, or alternatively, a wireless communication device may enforce a single-packet-type policy on a communication channel, such that only packets of a single type are conveyed on the channel. In this way, a wireless communication device may enable configuration of a particular type of header compression or decompression for all packets of the channel. Furthermore, the wireless communication device may reduce an amount of OTA network traffic relative to using only Ethernet header compression or not using any header compression, without a likelihood of incorrectly compressing and/or decompressing a packet.

As indicated above, FIG. 3 is provided as an example. Other examples may differ from what is described with respect to FIG. 3.

Figure 4:
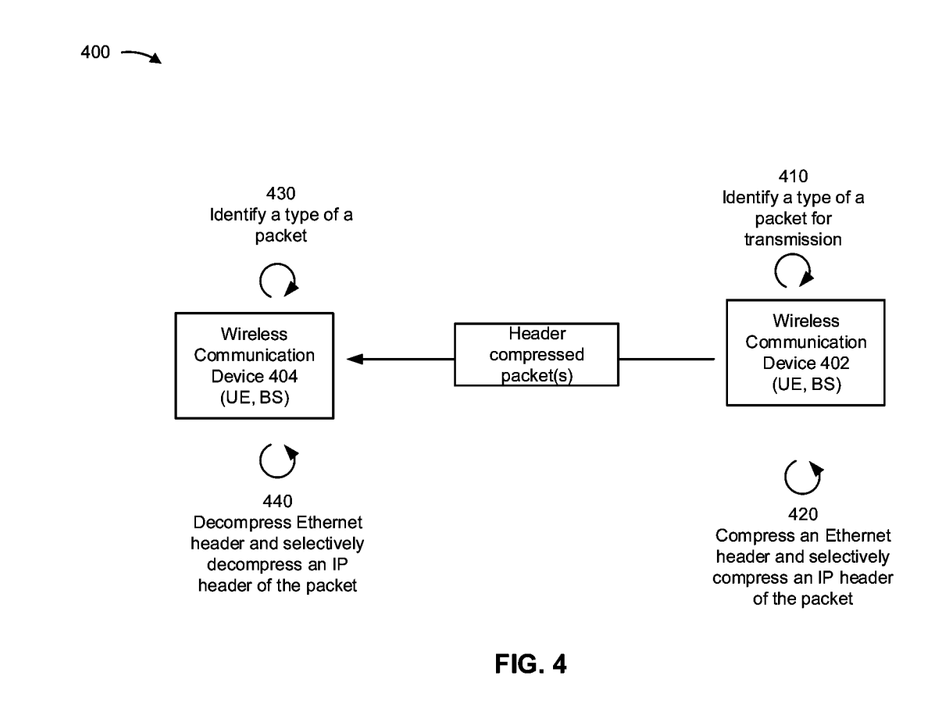
FIGS. 4 and 5 are diagrams illustrating examples of header compression and decompression management, in accordance with various aspects of the present disclosure.

FIG. 4 is a diagram illustrating an example 400 of header compression and decompression management, in accordance with various aspects of the present disclosure. As shown in FIG. 4, example 400 includes a wireless communication device 402 (e.g., BS 110 or UE 120) and a wireless communication device 404 (e.g., BS 110 or UE 120).

As further shown in FIG. 4, and by reference number 410, wireless communication device 402 may identify a type of packet for transmission. For example, wireless communication device 402 may determine whether a packet is an Ethernet-only packet type (e.g., an Ethernet packet and without IP payload). In this case, the Ethernet-only packet type may include data conveyed by a PDCP protocol data unit (PDU) that includes an Ethernet frame without any IP payload. Additionally, or alternatively, wireless communication device 402 may determine whether the packet is an Ethernet packet with IP payload type (e.g., an Ethernet packet with an IP payload). Additionally, or alternatively, wireless communication device 402 may determine whether the packet is an Ethernet packet with IPv4 payload, an Ethernet packet with IPv6 payload, and/or the like. In this case, the packet may include IP payload data, such as IPv4 type payload data, IPv6 type payload data, and/or the like. In some aspects, wireless communication device 402 may determine a type of a packet based at least in part on an Ethertype field of the packet.

Additionally, or alternatively, wireless communication device 402 may identify a type of PDCP PDU or service data unit (SDU). For example, although some aspects are described in terms of packets, wireless communication device 402 may perform processing on a PDU, an SDU, and/or the like. Additionally, or alternatively, although some aspects are described in terms of wireless communication device 402 transmitting to wireless communication device 404, another type of wireless communication device may transmit, such as wireless communication device 404 transmitting to wireless communication device 402.

As further shown in FIG. 4, and by reference number 420, wireless communication device 402 may compress an Ethernet header of the packet and selectively compress an IP header of the packet. For example, wireless communication device 402 may apply header compression (e.g., Ethernet header compression (EHC)) to a data field of an Ethernet frame in a payload of the packet or to an IP header in the packet. In this case, wireless communication device 402 may perform Ethernet header compression on the packet. In some aspects, wireless communication device 402 may perform Ethernet header compression before performing IP header compression. Additionally, or alternatively, wireless communication device may perform Ethernet header decompression after performing IP header compression.

Although some aspects describe IP header compression in terms of RoHC, other types of IP header compression may be possible.

Additionally, or alternatively, wireless communication device 402 may selectively perform IP header compression on the packet based at least in part on the type of the packet. For example, when the packet is an Ethernet-only packet type, wireless communication device 402 may forgo applying IP header compression to the packet. In this case, wireless communication device 402 may use a service data adaptation protocol (SDAP) entity, a PDCP entity, an RLC entity, or a MAC entity to enforce a policy with regard to whether to apply IP header compression and/or which type of IP header compression to apply.

Additionally, or alternatively, when the packet is an Ethernet with IPv4 payload type of packet, wireless communication device 402 may forgo applying IP header compression for IPv6 to the packet. In this case, wireless communication device 402 may apply IP header compression for IPv4 to the packet. Alternatively, when IPv4 compression is unavailable, wireless communication device 402 may forgo any IP header compression. Additionally, or alternatively, when the packet is an Ethernet with IPv6 payload type of packet, wireless communication device 402 may forgo applying IP header compression for IPv4 to the packet. In this case, wireless communication device 402 may apply IP header compression for IPv6 to the packet. Alternatively, when IPv6 compression is unavailable, wireless communication device 402 may forgo any IP header compression. For example, when wireless communication device 402 (or wireless communication device 404) does not support header compression (or decompression), wireless communication device 402 may not be configured for IPv6 compression, IPv4 compression, and/or the like and may forgo IP header compression.

In some aspects, wireless communication device 402 may apply a particular type of IP header compression. For example, wireless communication device 402 may apply an RoHC for IPv4 to an Ethernet packet with IPv4 payload. Additionally, or alternatively, wireless communication device 402 may apply an RoHC for IPv6 to an Ethernet type of packet with IPv6. Additionally, or alternatively, wireless communication device 402 may use another type of header compression technique for IP header compression of IPv6 payload, IP header compression of IPv4 payload, and/or the like.

In some aspects, wireless communication device 402 may transmit the packet. For example, wireless communication device 402 may transmit the packet with an indication of a type of the packet. In this case, wireless communication device 404 may receive the indication and may use the indication to determine the type of the packet and to determine decompression techniques to apply to the packet (e.g., Ethernet header decompression, IP header decompression, and/or the like).

As further shown in FIG. 4, and by reference number 430, wireless communication device 404 may identify a type of received packet. For example, wireless communication device 404 may determine whether the packet is an Ethernet-only packet type, an Ethernet packet with IP payload type, an Ethernet packet with IPv4 payload type, or an Ethernet packet with IPv6 payload type, as described above with regard to reference number 410 and header compression. In this case, wireless communication device 404 may use the indication of the type of the packet, as described above, to determine the type of the packet. As further shown by reference number 440, wireless communication device 404 may decompress an Ethernet header of the received packet and selectively decompress the IP header of the received packet. For example, wireless communication device 404 may perform Ethernet header decompression and/or IP header decompression, as described above with regard to reference number 420 and header compression.

As indicated above, FIG. 4 is provided as an example. Other examples may differ from what is described with respect to FIG. 4.

Figure 5:
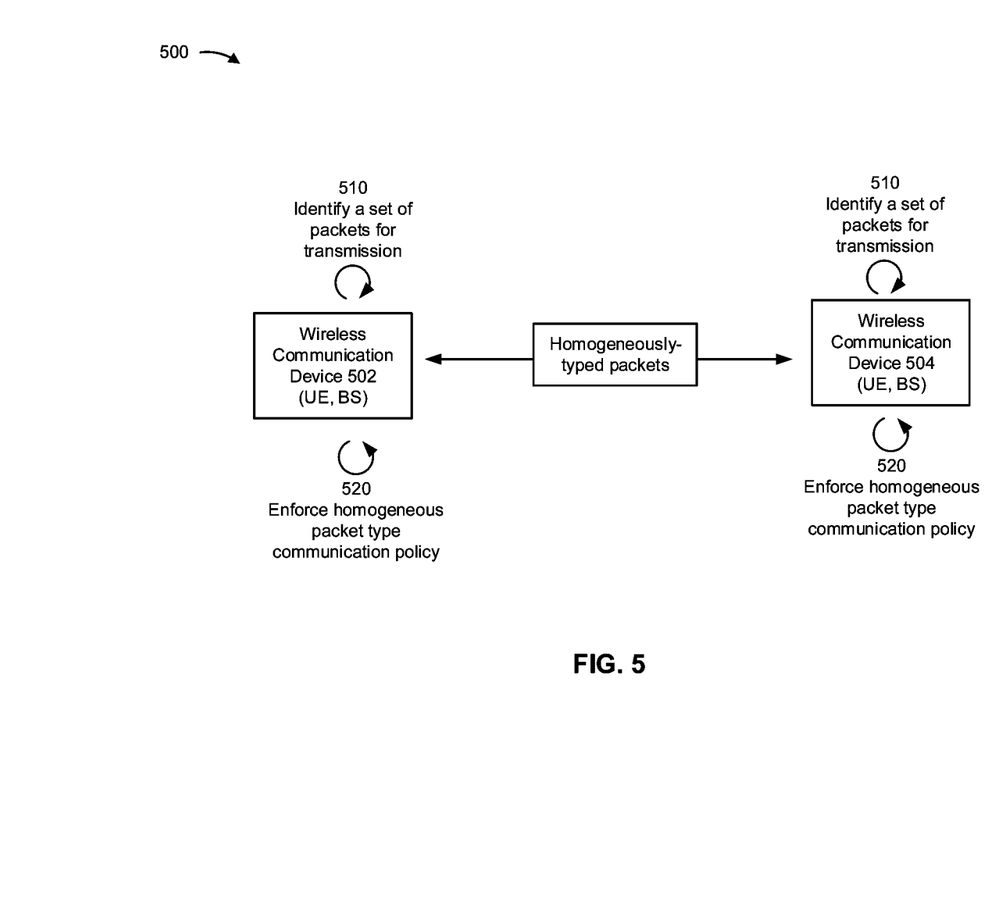

FIG. 5 is a diagram illustrating an example 500 of header compression and decompression management, in accordance with various aspects of the present disclosure. As shown in FIG. 5, example 500 includes a wireless communication device 502 (e.g., BS 110 or UE 120) and a wireless communication device 504 (e.g., BS 110 or UE 120).

As further shown in FIG. 5, and by reference numbers 510, wireless communication device 502 (or wireless communication device 504) may identify a set of packets for transmission. For example, wireless communication device 502 may receive a set of packets for transmission to wireless communication device 504 in a time sensitive network.

In some aspects, wireless communication device 502 may identify a particular type of packet for transmission. For example, wireless communication device 502 may identify an Ethernet-only packet type, an Ethernet packet with IP payload, an Ethernet packet with IPv4 payload, and Ethernet packet with IPv6 payload, and/or the like. In this case, the set of packets may be homogeneously-typed, in accordance with a homogeneous packet type communication that wireless communication device 502 (or wireless communication device 504) enforces, as shown by reference numbers 520. For example, wireless communication device 502 may transmit packets via a communication channel such that only a single type of packet is conveyed via the communication channel. In this way, wireless communication device 502 ensures that packets of only one packet type are sent using the communication channel, thereby avoiding errors in header compression or decompression associated with multiple different types of packets. In some aspects, wireless communication device 502 may identify the set of packets based at least in part on a value of a field. In some aspects, the field may be a field in an Ethernet header. For example, wireless communication device 504 may decompress the Ethernet header of the packet to determine the value of the field. In this case, the Ethertype field in an Ethernet header of a packet is example of such a field (e.g., a value of 0x0800 for the Ethertype field indicates that an Ethernet packet payload uses IPv4 and value of 0x86DD for the Ethertype field indicates that the Ethernet packet payload uses IPv6).

In some aspects, wireless communication device 502 may identify the set of packets using a packet configuration. For example, wireless communication device 502 may use a packet filter set configuration or a packet detection rule configuration to identify the set of packets for transmission using the communication channel. In this case, wireless communication device 502 may determine the packet filter set configuration or the packet detection rule configuration based at least in part on received signaling from wireless communication device 504 (e.g., via radio resource control (RRC) signaling), an access point, an access management function (AMF), a session management function (SMF), a user plane function (UPF), a core network node or function, and/or the like. In some aspects, wireless communication device 502 may identify the set of packets based at least in part on a received indication of a single packet type for communication via the communication channel, a received indication that a flow of packets of the communication channel is for the one packet type, and/or the like. In this case, wireless communication device 502 may receive such an indication from a RAN node, an AMF, an SMF, a UPF, a core network node or function, wireless communication device 504 (e.g., via RRC signaling), and/or the like.

In some aspects, the communication channel may be a particular type of communication channel. For example, BS 110 may identify a data radio bearer (DRB), a quality of service (QoS) flow, a PDU session, and/or the like for which to enforce a communication policy of homogeneously-typed packets being transmitted. In this case, Bs 110 may determine a configuration of the communication channel, and may provide information identifying the configuration to UE 120. Additionally, or alternatively, UE 120 may receive information identifying the configuration of the communication channel from a RAN node, an AMF, an SMF, a UPF, a core network node or function, and/or the like.

As indicated above, FIG. 5 is provided as an example. Other examples may differ from what is described with respect to FIG. 5.

Figure 6:
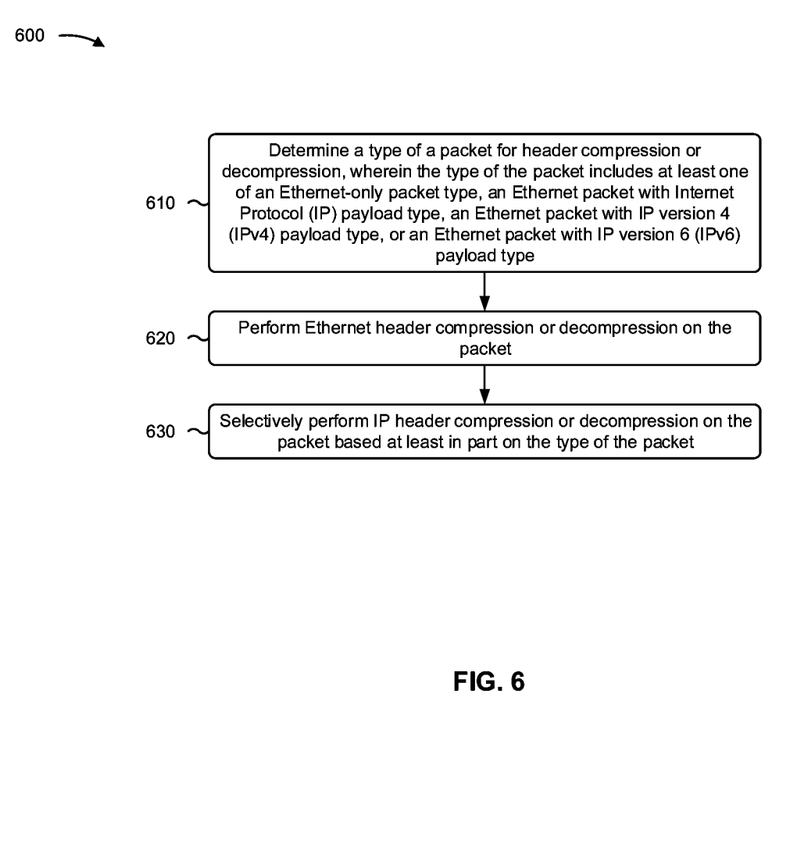
FIGS. 6 and 7 are diagrams illustrating example processes performed, for example, by a wireless communication device, in accordance with various aspects of the present disclosure.

FIG. 6 is a diagram illustrating an example process 600 performed, for example, by a wireless communication device, in accordance with various aspects of the present disclosure. Example process 600 is an example where the wireless communication device (e.g., BS 110, UE 120, wireless communication device 402, wireless communication device 404, wireless communication device 502, wireless communication device 504, and/or the like) performs operations associated with header compression and decompression management.

As shown in FIG. 6, in some aspects, process 600 may include determining a type of a packet for header compression or decompression, wherein the type of the packet includes at least one of an Ethernet-only packet type or an Ethernet packet with Internet Protocol (IP) payload type (block 610). For example, the wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may determine a type of a packet for header compression or decompression, wherein the type of the packet includes at least one of an Ethernet-only packet type or an Ethernet packet with Internet Protocol (IP) payload type, as described above.

As further shown in FIG. 6, in some aspects, process 600 may include performing Ethernet header compression or decompression on the packet (block 620). For example, the wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may perform Ethernet header compression or decompression on the packet, as described above.

As further shown in FIG. 6, in some aspects, process 600 may include selectively performing IP header compression or decompression on the packet based at least in part on the type of the packet (block 630). For example, the wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may selectively perform IP header compression or decompression on the packet based at least in part on the type of the packet, as described above.

Process 600 may include additional aspects, such as any single aspect or any combination of aspects described below and/or in connection with one or more other processes described elsewhere herein.

In a first aspect, the Ethernet packet with IP payload type includes an Ethernet packet with IP version 4 (IPv4) payload type or an Ethernet packet with IP version 6 (IPv6) payload type.

In a second aspect, alone or in combination with the first aspect, determining the type of packet comprises determining the type of packet based at least in part on an Ethertype field of the packet.

In a third aspect, alone or in combination with one or more of the first and second aspects, determining the type of the packet comprises determining that the packet is an Ethernet-only packet, and selectively performing IP header compression or decompression comprises forgoing applying IP header compression or decompression to the Ethernet-only packet.

In a fourth aspect, alone or in combination with one or more of the first through third aspects, determining the type of the packet comprises determining that the packet is an Ethernet packet with IP payload type, and selectively performing IP header compression or decompression comprises applying IP header compression or decompression to the Ethernet packet with IP payload type.

In a fifth aspect, alone or in combination with one or more of the first through fourth aspects, determining the type of the packet comprises determining that the packet is an Ethernet packet with IP version 6 (IPv6) payload, and selectively performing IP header compression or decompression comprises forgoing applying IP version 4 (IPv4) header compression or decompression to the Ethernet packet with IPv6 payload, and applying IPv6 header compression or decompression to the Ethernet packet with IPv6 payload.

In a sixth aspect, alone or in combination with one or more of the first through fifth aspects, determining the type of the packet comprises determining that the packet is an Ethernet packet with IP version 6 (IPv6) payload, and selectively performing IP header compression or decompression comprises determining that IPv6 header compression or decompression is unavailable for the Ethernet packet with IPv6 payload, and forgoing applying any header compression or decompression to the Ethernet packet with IPv6 payload based at least in part on determining that IPv6 header compression or decompression is unavailable for the Ethernet packet with IPv6 payload.

In a seventh aspect, alone or in combination with one or more of the first through sixth aspects, determining the type of the packet comprises determining that the packet is an Ethernet packet with IP version 4 (IPv4) payload, and selectively performing IP header compression or decompression comprises determining that IPv4 header compression or decompression is unavailable for the Ethernet packet with IPv4 payload, and forgoing applying any header compression or decompression to the Ethernet packet with IPv4 payload based at least in part on determining that IPv4 header compression or decompression is unavailable for the Ethernet packet with IPv4 payload.

In an eighth aspect, alone or in combination with one or more of the first through seventh aspects, determining the type of the packet comprises determining that the packet is an Ethernet packet with IP version 4 (IPv4) payload, and selectively performing IP header compression or decompression comprises forgoing applying IP version 6 (IPv6) header compression or decompression to the Ethernet packet with IPv4 payload, and applying IPv4 header compression or decompression to the Ethernet packet with IPv4 payload.

In a ninth aspect, alone or in combination with one or more of the first through eighth aspects, selectively performing IP header compression or decompression comprises including, with a compressed packet generated by performing header compression, an indication of the type of the packet to enable header decompression.

In a tenth aspect, alone or in combination with one or more of the first through ninth aspects, selectively IP performing header compression or decompression comprises selectively performing IP header compression or decompression using a service data adaptation protocol, a packet data convergence protocol, a radio link control protocol, or a medium access control protocol.

In an eleventh aspect, alone or in combination with one or more of the first through tenth aspects, the wireless communication device is a user equipment or a base station.

In a twelfth aspect, alone or in combination with one or more of the first through eleventh aspects, selectively performing IP header compression or decompression comprises performing IP header decompression based at least in part on a type of header compression applied to the packet.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
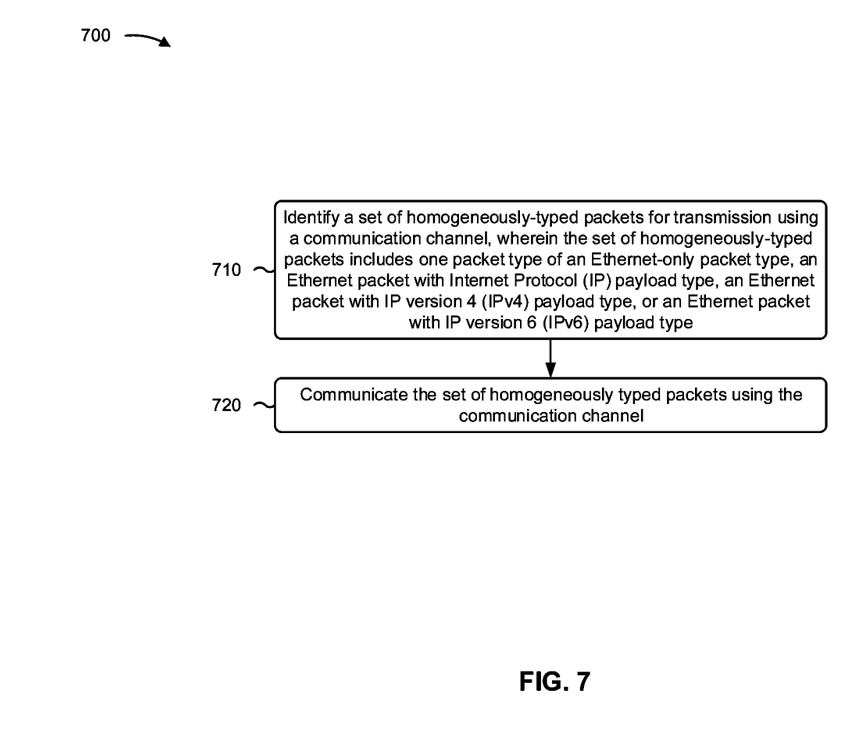

FIG. 7 is a diagram illustrating an example process 700 performed, for example, by a wireless communication device, in accordance with various aspects of the present disclosure. Example process 700 is an example where the wireless communication device (e.g., BS 110, UE 120, wireless communication device 402, wireless communication device 404, wireless communication device 502, wireless communication device 504, and/or the like) performs operations associated with header compression and decompression management.

As shown in FIG. 7, in some aspects, process 700 may include identifying a set of homogeneously-typed packets for transmission using a communication channel, wherein the set of homogeneously-typed packets includes one packet type of an Ethernet-only packet type or an Ethernet packet with Internet Protocol (IP) payload type (block 710). For example, the wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may identify a set of homogeneously-typed packets for transmission using a communication channel, wherein the set of homogeneously-typed packets includes one packet type of an Ethernet-only packet type or an Ethernet packet with Internet Protocol (IP) payload type, as described above.

As further shown in FIG. 7, in some aspects, process 700 may include communicating the set of homogeneously typed packets using the communication channel (block 720). For example, the wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may communicate the set of homogeneously typed packets using the communication channel, as described above.

Process 700 may include additional aspects, such as any single aspect or any combination of aspects described below and/or in connection with one or more other processes described elsewhere herein.

In a first aspect, the Ethernet packet with IP payload type includes an Ethernet packet with IP version 4 (IPv4) payload type or an Ethernet packet with IP version 6 (IPv6) payload type.

In a second aspect, alone or in combination with the first aspect, identifying the set of homogeneously-typed packets comprises identifying the one packet type based at least in part on an Ethertype field of the set of homogeneously-typed packets.

In a third aspect, alone or in combination with one or more of the first and second aspects, the communication channel is at least one of a data radio bearer, a quality of service flow, or a protocol data unit session.

In a fourth aspect, alone or in combination with one or more of the first through third aspects, identifying the set of homogeneously-typed packets comprises identifying the set of homogeneously-typed packets based at least in part on at least one of a packet filter set configuration or a packet detection rule configuration associated with the communication channel.

In a fifth aspect, alone or in combination with one or more of the first through fourth aspects, identifying the set of homogeneously-typed packets comprises identifying the set of homogeneously-typed packets based at least in part on a received radio access network indication of the one packet type.

In a sixth aspect, alone or in combination with one or more of the first through fifth aspects, identifying the set of homogeneously-typed packets comprises identifying the set of homogeneously-typed packets based at least in part on a received indication indicating that a flow of packets of the communication channel is for the one packet type.

In a seventh aspect, alone or in combination with one or more of the first through sixth aspects, identifying the set of homogeneously-typed packets comprises identifying the set of homogeneously-typed packets based at least in part on a received indication indicating that a data radio bearer of the communication channel is for the one packet type.

In an eighth aspect, alone or in combination with one or more of the first through seventh aspects, communicating the set of homogeneously-typed packets comprises communicating the set of homogeneously-typed packets, such that only one packet type is communicated using the communication channel based at least in part on at least one of a data radio bearer configuration or a service data adaptation protocol configuration.

In a ninth aspect, alone or in combination with one or more of the first through eighth aspects, communicating the set of homogeneously-typed packets comprises communicating the set of homogeneously-typed packets, such that only one packet type is communicated using the communication channel based at least in part on a received indication from a radio access network node or a core network device.

In a tenth aspect, alone or in combination with one or more of the first through ninth aspects, process 700 includes providing, via radio resource control signaling and to a user equipment that is to receive the set of homogeneously-typed packets, information indicating a type of decompression to perform on the set of homogeneously-typed packets.

In an eleventh aspect, alone or in combination with one or more of the first through tenth aspects, process 700 includes selecting a type of IP compression or IP decompression to perform on the set of homogeneously-typed packets based at least in part on identifying the set of homogeneously-typed packets.

In a twelfth aspect, alone or in combination with one or more of the first through eleventh aspects, the type of IP compression is one of IP header compression, IP version 4 (IPv4) header compression, or IP version 6 (IPv6) header compression.

In a thirteenth aspect, alone or in combination with one or more of the first through twelfth aspects, the type of IP decompression is one of IP header decompression, IP version 4 (IPv4) header decompression, or IP version 6 (IPv6) header decompression.

In a fourteenth aspect, alone or in combination with one or more of the first through thirteenth aspects, process 700 includes performing Ethernet header compression and IP header compression.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
   determining a type of a packet for header compression or decompression based at least in part on an Ethertype field of the packet, wherein the type of the packet includes at least one of an Ethernet-only packet type or an Ethernet packet with Internet Protocol (IP) payload type, wherein determining the type of the packet further comprises determining that the packet is an Ethernet packet with IP version 4 (IPv4) payload or an Ethernet packet with IP version 6 (IPv6) payload;
   performing Ethernet header compression or decompression on the packet; and
   selectively performing IP header compression or decompression on the packet based at least in part on the type of the packet, wherein selectively performing IP header compression or decompression comprises:
      determining that IPv4 header compression or decompression is unavailable for the Ethernet packet with IPv4 payload or that IPv6 header compression or decompression is unavailable for the Ethernet packet with IPv6 payload; and
      forgoing applying any header compression or decompression to the Ethernet packet with IPv4 payload or the Ethernet packet with IPv6 payload based at least in part on determining that IPv4 header compression or decompression is unavailable for the Ethernet packet with IPv4 payload or that IPv6 header compression or decompression is unavailable for the Ethernet packet with IPv6 payload.

2. The method of claim 1, wherein determining the type of the packet comprises determining that the packet is an Ethernet-only packet; and
   wherein selectively performing IP header compression or decompression comprises:
      forgoing applying IP header compression or decompression to the Ethernet-only packet.

3. The method of claim 1, wherein determining the type of the packet comprises: determining that the packet is an Ethernet packet with IP payload type; and wherein selectively performing IP header compression or decompression comprises:
applying IP header compression or decompression to the Ethernet packet with IP payload type.

4. The method of claim 1, wherein determining the type of the packet comprises determining that the packet is an Ethernet packet with IP version 6 (IPv6) payload; and
wherein selectively performing IP header compression or decompression comprises:
forgoing applying IP version 4 (IPv4) header compression or decompression to the Ethernet packet with IPv6 payload; and
applying IPv6 header compression or decompression to the Ethernet packet with IPv6 payload.

5. The method of claim 1, wherein determining the type of the packet comprises determining that the packet is an Ethernet packet with IP version 4 (IPv4) payload; and
wherein selectively performing IP header compression or decompression comprises:
forgoing applying IP version 6 (IPv6) header compression or decompression to the Ethernet packet with IPv4 payload; and
applying IPv4 header compression or decompression to the Ethernet packet with IPv4 payload.

6. The method of claim 1, wherein selectively performing IP header compression or decompression comprises:
including, with a compressed packet generated by performing header compression, an indication of the type of the packet to enable header decompression.

7. The method of claim 1, wherein selectively IP performing header compression or decompression comprises:
selectively performing IP header compression or decompression using a service data adaptation protocol, a packet data convergence protocol, a radio link control protocol, or a medium access control protocol.

8. The method of claim 1, wherein the wireless communication device is a user equipment or a base station.

9. The method of claim 1, wherein selectively performing IP header compression or decompression comprises:
performing IP header decompression based at least in part on a type of header compression applied to the packet.

10. A wireless communication device for wireless communication, comprising:
a memory; and
one or more processors operatively coupled to the memory, the memory and the one or more processors configured to:
determine a type of a packet for header compression or decompression based at least in part on an Ethertype field of the packet, wherein the type of the packet includes at least one of an Ethernet-only packet type or an Ethernet packet with Internet Protocol (IP) payload type, wherein determining the type of the packet further comprises determining that the packet is an Ethernet packet with IP version 4 (IPv4) payload or an Ethernet packet with IP version 6 (IPv6) payload;
perform Ethernet header compression or decompression on the packet; and
selectively perform IP header compression or decompression on the packet based at least in part on the type of the packet, wherein selectively performing IP header compression or decompression comprises:
determining that IPv4 header compression or decompression is unavailable for the Ethernet packet with IPv4 payload or that IPv6 header compression or decompression is unavailable for the Ethernet packet with IPv6 payload; and
forgoing applying any header compression or decompression to the Ethernet packet with IPv4 payload or the Ethernet packet with IPv6 payload based at least in part on determining that IPv4 header compression or decompression is unavailable for the Ethernet packet with IPv4 payload or that IPv6 header compression or decompression is unavailable for the Ethernet packet with IPv6 payload.

* * * * *